UNITED STATES PATENT OFFICE 2,232,588

CELLULAR BUILDING UNIT

Thomas P. Camp, Arlington Heights, Ill., assignor to United States Gypsum Company, Chicago, Ill., a corporation of Illinois No Drawing. Application January 7, 1938, Serial No. 183,834

12 Claims. (Cl. 106—24)

The present invention relates to construction materials, and more particularly, to a lightweight construction unit or building element such as gypsum board, building block, tile, insulating brick, acoustical materials, and the like, and to a process of manufacturing the same.

In the production of lightweight construction materials such as building elements, for example, wallboard, it is generally desirable to produce a lightweight cellular product, the advantages of which are well known and recognized by the art.

Several methods have been proposed for the production of said lightweight porous substances from calcined gypsum slurries, plastic argillaceous masses, and other cementitious materials. For example, lightweight products may be produced by the interaction of calcium carbonate and an acid salt, such as aluminum sulfate with the formation of carbon dioxide voids. In such processes, it is rather difficult to control the uniformity of the finished product due to variations in the dispersion of the active ingredients.

It has been found that a non-uniform cell structure is detrimental to the strength of the finished product, since large voids or cells tend to create points of weakness. Therefore, in order to obtain the utmost advantage from the lightweight cellular structure, all of the cells should be uniform with respect to size and distribution.

One of the objects of the present invention is to provide a lightweight cellular construction unit of controlled weight and strength, as well as a process of producing the same.

A more particular object is to provide a cellular construction material in which the cells are uniform in size and evenly distributed throughout the mass.

Another object is to provide a method of producing a cellular construction material from a plastic composition, said process being readily controllable as to cell size and distribution.

A further object is to impart to the finished product superior water-resistant properties.

Other objects will become apparent as the invention is hereinafter more fully described.

The foregoing and other objects may be accomplished in accordance with the present invention, one aspect of which comprises a process of manufacturing a structural or building unit or element which includes the step of dispersing or uniformly distributing, in a plastic composition, a volatile, low-boiling liquid which is immiscible with said composition, the vapors of said liquid likewise being insoluble in said composition. After the liquid has been thoroughly dispersed throughout the body of the plastic composition, and the desired shape formed from said composition, the vaporization of the liquid is effected, to produce a multiplicity of voids of uniform size and distribution throughout the body of the mass. The formed, porous mass is subsequently caused to harden.

The foregoing process may be applied to plastic compositions, such as those containing a cementitious material, for example, those substantially consisting of a slurry of gypsum. It may also be applied, however, to a plastic argillaceous composition containing sufficient gypsum to effect the hardening of the formed mass prior to the burning or firing thereof, so that the shaped, unburned products may be placed in the kiln with a minimum loss from handling.

For the purpose of explaining the nature of the present invention more clearly, it will be convenient to illustrate the application thereof to the manufacture of plaster board from gypsum. It should be understood, however, that this is done merely by way of example, and solely for the purpose of illustrating, by means of such specific example, the basic principles of the present invention, which are broadly applicable to the manufacture of many materials other than those hereinafter specifically mentioned.

Example

To produce a gypsum wallboard having a uniform cellular core structure, a volatile, low-boiling, non-water-miscible, substantially water-insoluble liquid, such as pentane, is incorporated in a prepared slurry of calcined gypsum. This mixing should be both rapid and thorough, in order to prevent the loss of volatile liquid by evaporation during the mixing process, and to assure uniform distribution of the liquid throughout the slurry. The thoroughly mixed plastic gypsum composition is uniformly spread on a fibrous liner, which moves by means of a conveyor belt toward the master roll at a uniform rate of speed. The belt carrying the fibrous liner and the mixed slurry is adusted to a speed which will allow the pentane to completely vaporize and form voids before the top fibrous liner is applied at the master roll. The formed gypsum board moves on the conveyor belt until set, whereupon it is cut into suitable lengths, dried and stored.

In the manufacture of paper covered boards as described above, the low-boiling liquid should be completely vaporized before the mixed slurry passes under the master roll; otherwise blisters will occur between the fibrous liners and the core, due to the gas evolved after the application of the fibrous liners. Inasmuch as the rate of vaporization of the low-boiling liquid will be governed largely by the temperature of the slurry, heat may be applied to the slurry after mixing, or hot water may be used in mixing in a conventional manner, before applying the top fibrous liner.

In some cases it may be preferred to aid the retention of the gas in the prepared slurry of gypsum and obtain a lighter product. This may be accomplished, if so desired, by introducing into the slurry at any suitable step in the process, a gas-entraining agent, such as soap bark, rosin soap, glue, or calcium stearate in proper solvents or in the low-boiling liquid. Many other materials may be used as gas-entraining agents, but it is important that the material chosen be non-reactive with the liquid or gas phase of the cell-forming material. These gas-entraining materials will not only retain more of the generated gas, but will also form a thin resilient coating around the periphery of each cell. It has been found that this resilient coating materially strengthens the cell walls.

Any volatile liquid may be used for introduction into the plastic mass which is substantially insoluble in water and has a boiling point not exceeding that of water. Preferably the boiling point should be between room temperature and about 100° C.

The choice of a suitable gas generating liquid will be governed largely by plant conditions. There are many materials such as ether, carbon tetrachloride, chloroform, methylene chloride, dichloromonofluoro methane, trichloro monofluoro methane, dichloro tetrafluoro ethane, ethyl chloride, ethylene chloride, ethylidene dichloride, methyl formate, and the like, which may be used, if desired, for the purpose of the present invention. When the liquid used is one which is capable of forming explosive mixtures with air (as in the case of pentane), care must be taken to provide adequate ventilation in the drying kiln, the amount of air supplied being adjusted to prevent the mixture of gas and air attaining explosive proportions. If desired, an inert gas, such as carbon dioxide, nitrogen, etc., may be introduced into the kiln to prevent the formation of such explosive mixtures.

In order to render the process more economical, suitable apparatus can be used to collect and condense or absorb the evaporated liquids in the dryer and thus recover the volatile liquid. Apparatus of this character is well known in the art, and, as apparatus, forms no part of the present invention. Its application, however, will be readily apparent to those skilled in the art, and is included within the scope of the present invention.

The quantity of low-boiling liquid needed to produce the desired cellular structure will vary with the type of liquid chosen. However, in the manufacture of a preferred embodiment of the present invention, it has been found that the addition of approximately 40 pounds of pentane to 1200 pounds of calcium sulfate hemihydrate, together with a gas entraining agent and other common ingredients of plasterboard core, will produce a lightweight unit of the desired cellular structure.

It has also been found that when a waterproofing agent such as beeswax, paraffin, or the like, is dissolved in the low-boiling volatile liquid and the resulting solution incorporated with the plastic composition, a product having remarkable water-resistant properties is produced.

It the past it has been very difficult to introduce such waterproofing materials satisfactorily into a cementitious mix such as plaster of Paris, for the materials would affect the set and other physical characteristics of the product, as pointed out in a copending application, Serial No. 98,576, now Patent No. 2,178,776. However, using the procedure of the present invention, the usual disadvantages resulting from the incorporation of waterproofing agents are obviated.

It should be noted that the process of mixing the low-boiling liquid into the plastic mass involves the mixing and distributing of volatile cell-forming liquids, rather than the incorporation of a compressible gas. Due to the incompressible nature of the liquid, substantially all of the cell-forming material is therefore utilized in the formation of cells, and its void-forming action is not decreased during the mixing process.

The thorough mixing of the liquid insures a uniform cellular structure, both as to size and distribution of the cells. Inasmuch as substantially all of the liquid is effective in the formation of voids, the weight of the product may be readily controlled by varying the amount of volatile liquid incorporated into or dispersed in the slurry.

In the foregoing detailed description of the present invention, it is apparent that many variations may be made without departing from the spirit and scope thereof. Thus, the volatile, low-boiling water-insoluble liquid may be dispersed in water, for example, to form a liquid-in-water emulsion, and this emulsion may be incorporated with the plastic composition. This in effect performs the one-step operation described in the specific example, in the two steps.

The principle of the present invention may, if desired, be applied to other plastic compositions, for example, argillaceous slips, and to cementitious compositions as well.

Furthermore, many other water-immiscible liquids having a low boiling-point may be used as the equivalent of those specifically mentioned, and anyone skilled in the art will readily perceive of additional examples of such fluids.

It is also apparent that fibrous materials may be incorporated in the plastic composition, as well as other common ingredients of such compositions.

The shape of the finished product may be changed as desired, and although the preferred embodiment comprises a plaster board, it is apparent that other structural elements such as blocks and the like, may, if desired, be manufactured in accordance with the principles of the present invention.

Many other variations will be apparent to anyone skilled in the art.

I therefore intend to be limited only in accordance with the following patent claims.

I claim:

1. In the process of manufacturing a cellular building unit, the improvement which comprises dispersing in a plastic composition containing a major proportion by weight of calcined gypsum, a solution of a waterproofing agent in a volatile liquid immiscible with said plastic composition, effecting the vaporization of said dispersed liquid, forming the plastic composition into the desired shape, and subsequently effecting the hardening of said plastic composition.

2. In the process of manufacturing a cellular construction unit, the improvement which includes dispersing in a plastic composition containing a major proportion by weight of calcined gypsum and a gas-entraining agent, a volatile liquid immiscible in said composition, effecting the vaporization of said dispersed liquid, forming the plastic composition into the desired shape, and subsequently effecting the hardening of said plastic composition.

3. In the process of manufacturing a cellular building unit, the improvement which includes dispersing in a plastic cementitious composition containing a gas-entraining agent, a water-insoluble volatile liquid containing a waterproofing agent, effecting the vaporization of said dispersed liquid, forming the plastic composition into the desired shape, and subsequently effecting the hardening of said plastic composition.

4. In the process of manufacturing a cellular building unit, the improvement which includes dispersing, in a plastic cementitious composition containing a gas-entraining agent, a water-insoluble, volatile liquid, effecting the vaporization of said dispersed liquid, forming the plastic composition into the desired shape, and subsequently effecting the hardening of said plastic composition.

5. In the process of manufacturing a cellular building unit, the improvement which includes dispersing, in a plastic cementitious composition, a water-insoluble volatile liquid containing a waterproofing agent dissolved therein, effecting the vaporization of said dispersed liquid, forming the plastic composition into the desired shape, and subsequently effecting the hardening of said plastic composition.

6. In the process of manufacturing plaster board, the improvement which includes dispersing a water-insoluble, volatile liquid in a plastic mixture of calcined gypsum and a gauging fluid containing a gas-entraining agent, effecting the vaporization of said liquid, forming the plastic mixture into the desired shape, and subsequently effecting the hardening of said plastic mixture.

7. In the process of manufacturing plaster board, the improvement which includes dispersing a water-insoluble, volatile liquid containing a waterproofing agent in a plastic mixture of calcined gypsum and a gauging fluid, forming the plastic mixture containing the dispersed liquid into the desired shape, effecting the vaporization of said dispersed liquid, and subsequently effecting the hardening of said plastic mixture.

8. In the process of manufacturing a plaster board, the improvement which includes dispersing a water-insoluble, volatile liquid containing a waterproofing agent in a plastic mixture of calcined gypsum and a gauging fluid containing a small amount of gas-entraining agent, effecting the vaporization of said dispersed liquid, forming the plastic mixture into the desired shape, and subsequently effecting the hardening of said plastic mixture.

9. The process of manufacturing a cellular building unit which comprises thoroughly mixing an inorganic set-hardenable plastic composition, a gas-entraining agent, and a substantially water-insoluble volatile liquid, effecting the vaporization of said liquid from the resulting plastic mass while in the dispersed condition whereby spaced voids are formed in the mass, forming the mass into the desired shape, and subsequently effecting the hardening of the same.

10. The process of manufacturing a cellular building unit which comprises thoroughly mixing an inorganic set-hardenable plastic composition with a water-insoluble volatile liquid and waterproofing agent, effecting the vaporization of said liquid from the resulting plastic mass while in the dispersed condition whereby spaced voids are formed in the mass, forming the mass into the desired shape, and subsequently effecting the hardening of the same.

11. The process recited in claim 9 wherein said plastic composition comprises a mixture of water and an argillaceous material.

12. The process recited in claim 10 wherein said plastic composition comprises a mixture of water and an argillaceous material.

THOMAS P. CAMP.